Aug. 14, 1945.
F. J. HANSGIRG
2,382,713
PROCESS FOR MANUFACTURING MAGNESIUM
Filed July 12, 1941
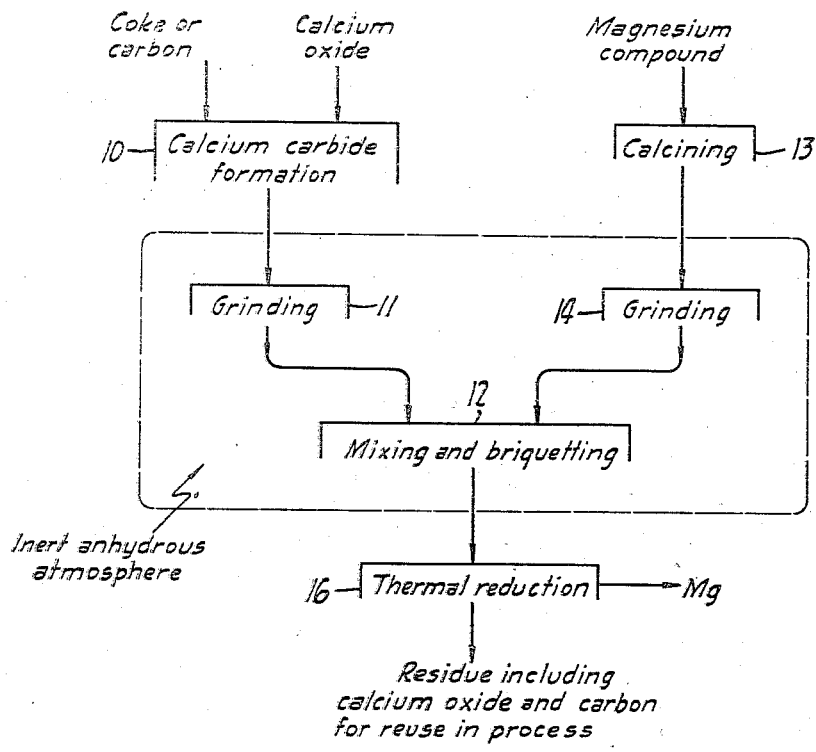
INVENTOR
Fritz J. Hansgirg
BY Paul D. Flehr
ATTORNEY Patented Aug. 14, 1945

2,382,713

UNITED STATES PATENT OFFICE 2,382,713

PROCESS FOR MANUFACTURING MAGNESIUM

Fritz J. Hansgirg, San Mateo, Calif., assignor to Marine Magnesium Products Corporation, South San Francisco, Calif., a corporation of Delaware Application July 12, 1941, Serial No. 402,161

2 Claims. (Cl. 75—67)

This invention relates generally to processes for the manufacture of metallic magnesium by thermal reduction of magnesium compounds such as magnesium oxide. More particularly it relates to processes making use of thermal reduction of magnesium oxide with calcium carbide.

In a process of the above character one problem is to secure a relatively high yield of metallic magnesium for the amount of calcium carbide employed. Calcium carbide is a relatively expensive reducing agent, and its wasteful utilization in the process increases the cost of production of the metal.

In the past it has been appreciated that utilization of a relatively small particle size for the reacting ingredients tends to promote the efficiency of the reaction. However, finely grinding the reacting ingredients will not of itself improve the efficiency of the reaction to the point desired, although it does serve to afford a noticeably better yield. The matter of moisture present in the reacting ingredients has not been fully understood by prior investigators. Apparently they have been satisfied with use of ostensibly dry ingredients.

I have found that the presence of even small amounts of moisture in the reacting ingredients has a decided effect upon the efficiency of the reaction. What may appear to be anhydrous reacting ingredients generally contain sufficient moisture in one form or another to seriously interfere with the efficiency of the reaction. When charge of calcium carbide intermixed with magnesium oxide is heated for the reducing operation, the moisture present causes the formation of complex gaseous hydrocarbons. Aside from the consumption of calcium carbide which occurs simultaneously with formation of such hydrocarbons, their presence during evolution of magnesium vapor may interfere with the purity of the magnesium metal obtained.

I have found that by the total elimination of moisture from the reacting ingredients, including combined water, water of crystallization, or absorbed moisture, together with complete elimination of combined or absorbed carbon dioxide, the efficiency of the reaction can approach 100%. My process, therefore, involves steps which insure a mixture of ingredients at the time thermal reduction is initiated, which are devoid of moisture.

In view of the above, it is an object of the invention to improve upon the efficiency of the reaction of calcium carbide with magnesium oxide for the manufacture of metallic magnesium. Another object is to reduce the time period required for the reaction.

Further objects and features of the present invention will appear from the following specification in which the preferred embodiments have been set forth in detail in conjunction with the accompanying drawing.

Referring to the flow sheet of the drawing for a better understanding of the process, I have shown the calcium carbide being used in the process, being manufactured by operation 10. This is customarily carried out in a suitable electrical furnace which is charged with coke and calcium oxide. The calcium carbide is then subjected to grinding at 11, and is supplied to the mixing and briquetting operation 12.

The magnesium oxide used in the process is obtained from some suitable source, such as a precipitated magnesium hydroxide, or other natural magnesium compound, which is subjected to the calcining operation 13 to form magnesium oxide. This calcining should be carried out at relatively high temperatures, as for example from 900 to 1100° C. for a period of time sufficient to totally remove all moisture, including water combined as magnesium hydroxide, water of crystallization, or absorbed moisture. Also, such treatment removes all combined or absorbed carbon dioxide, which would be detrimental if present during thermal reduction. The magnesium oxide is also subjected to fine grinding at 14, and is then supplied to the mixing and briquetting operation 12 where thorough and uniform mixing occurs followed by pressing into pellets or briquets. The resulting briquets are then supplied to the thermal reduction operation 16 which is carried out by use of suitable equipment known to those skilled in the art. This equipment may consist of a gas tight retort into which the briquets are charged, and which is heated under controlled conditions by a suitable furnace. Suitable condensing means is utilized in conjunction with the retort for condensing the evolved magnesium vapor to the form of a solid crystallized mass. It is desirable to carry out the reduction operation at temperatures such as from 1050 to 1115° C., under a vacuum such as 1 mm. of mercury.

The residue from the reaction consists of the end products calcium oxide and carbon, together with amounts of unreacted magnesium oxide and calcium carbide, depending upon the efficiency of the thermal reduction reaction.

I have found that within a comparatively short time after calcium carbide has been produced, it absorbs moisture from the atmosphere, and such absorbed moisture is sufficient to interfere with the desired high efficiency of reaction in the thermal reduction operation. The same applies to magnesium oxide after the calcining operation. It is ordinarily considered that calcium carbide cannot retain moisture absorbed from the atmosphere because this moisture causes reaction to form acetylene gas. However, appreciable amounts of moisture can be absorbed by the calcium oxide content of commercial calcium carbide, and such moisture can be retained in combined form without reacting with the calcium carbide.

In order to secure a totally anhydrous mix for the charge being placed in the reduction retort, I totally envelop both the calcium carbide and the calcined magnesium oxide in an inert anhydrous atmosphere from the time these ingredients are produced, until they are placed in the retort of the thermal reduction furnace. This can be carried out by procedures known to those skilled in the art. The inert gas may be a gas like nitrogen or helium, or any other gas which will not react in any way with the ingredients. It will be evident that the enveloping of the ingredients in such an inert anhydrous atmosphere requires the use of closed conveying equipment for transferring the ingredients through the several operations from the carbide furnace and the calcining operation 13 to final positioning of the briquets in the retort of the reduction furnace. Also, the grinding and mixing and briquetting operations must be carried out by suitably enclosed equipment.

As previously stated, it is desirable to carry out relatively fine grinding of the ingredients. In practice I have found it desirable to grind both calcium carbide and the magnesium oxide to about 90% minus 200 mesh or even finer.

The calcium carbide and magnesium oxide can be intermixed in stoichiometric proportions. When carried out as described, the efficiency of the reaction approaches 100%, with the amount of magnesium oxide in the residue being say 2% or less, and with only traces of unreacted calcium carbide. The time period of reaction is made relatively short by use of my process. For example, the time period of heat treatment can be from, say, 6 to 10 hours.

The residue from operation 16, because of its small magnesium content, can be used to prepare additional carbide in operation 18, by mixing it with additional carbon. Also, it can be used as a precipitant for reaction with sea water or other brine containing convertible magnesium salts, for precipitation of magnesium hydroxide. In such event, the carbon of the residue is recovered with the precipitated hydroxide and is burned to supply heat for converting the hydroxide to magnesium oxide for further use in the process.

I claim:

1. In a process for the manufacture of metallic magnesium by thermal reduction of magnesium oxide with calcium carbide, the steps of forming calcium carbide from carbon and calcium oxide, forming magnesium oxide by calcining a magnesium compound to form a totally anhydrous magnesium oxide, grinding both the freshly formed calcium carbide and the magnesium oxide, intermixing the ground ingredients and forming the same into briquets, subjecting the briquets to thermal reduction operation for evolution of metallic magnesium, and enveloping both the calcium carbide and the calcined magnesium oxide from the time of production of these ingredients to introduction of the same into the thermal reduction operation, in an inert anhydrous atmosphere.

2. In a process for the manufacture of metallic magnesium by thermal reduction of solid phase magnesium oxide with solid phase calcium carbide, the steps of forming a totally anhydrous magnesium oxide by calcining a magnesium compound at an elevated temperature, passing the oxide through a grinding operation to produce a relatively finely ground magnesium oxide, mixing and briquetting the ground magnesium oxide with solid phase divided calcium carbide, subjecting the briquets to thermal reduction at an elevated temperature and under a partial vacuum for evolution of magnesium vapor, and enveloping the aforesaid grinding and briquetting operations in an inert anhydrous atmosphere.

FRITZ J. HANSGIRG.